SYSTEM FOR RECORDING AND REPRODUCING A PERIODIC SIGNAL

Filed Oct. 21, 1963

2 Sheets-Sheet 1

INVENTORS
MASATOSHI OKAZAKI
SHIRO OKAMURA
BY
Hopgood & Calimafde
ATTORNEYS

INVENTORS
MASATOSHI OKAZAKI
SHIRO OKAMURA
BY
Hopgood & Calimafde
ATTORNEYS

United States Patent Office 3,375,331
Patented Mar. 26, 1968

3,375,331
SYSTEM FOR RECORDING AND REPRODUCING A PERIODIC SIGNAL

Masatoshi Okazaki and Shiro Okamura, Tokyo, Japan, assignors to Nippon Electric Company Limited, Tokyo, Japan, a corporation of Japan Filed Oct. 21, 1963, Ser. No. 317,478
7 Claims. (Cl. 179—100.2)

ABSTRACT OF THE DISCLOSURE

A video signal is recorded on magnetic tape in oblique tracks relative to the translation direction of the tape medium. It is reproduced by a sensing means whose tracking direction is variable relative to the recording medium and depends upon the velocity of the medium.

This invention relates to a system for recording and reproducing a periodic signal of the video type, and particularly to a system for reproducing a television picture at a different time rate from the original phenomena.

Although video tape recording has been subjected to widespread employment in the television industry, the requirement for slow or still motion reproduction has not been fully satisfied by the art. Present systems employ obliquely recorded tracks arranged in parallel; each track being composed of one video field. To yield slow or still motion the loci of the horizontal blanking periods in each track are arranged substantially in line, and the reproducing head strides over adjacent tracks when the reproducing tape speed is slowed down (slow motion) or the tape movement is stopped ("stills").

Such an arrangement, however, suffers from the inherent difficulty in arranging the blanking periods correctly, because of the unavoidable jitter of the rotating head system. Thus, the reproduced picture usually has imperfect zones, which distort the image, due to the cross over between adjacent fields having misaligned horizontal blanking portions. Further, the reproduced image exhibits distortion resulting from a certain number of the horizontal lines being skipped or duplicated. This phenomena yields an unnaturally shortened or elongated part of the image.

Hence it is an object of the present invention to obtain a reproduced picture at any practical reproduction speed relative the recorded phenomenon, without the necessity of utilizing zone cross over.

It is another object of the present invention to provide a video tape recorder which dispenses with the tracking control means heretofore required to insure the reproducing head accurately tracks the recorded loci.

Briefly, the invention is predicated upon the concept of recording the video signal in oblique tracks relative the translation direction of the recording medium and reproducing the signal by a sensing means whose tracking direction, relative the recording medium, is dependent upon the velocity of the medium. In other words, an arrangement is provided whereby it is possible at any reproduction speed to track with an inclination equal to the recording locus.

Figure 1:
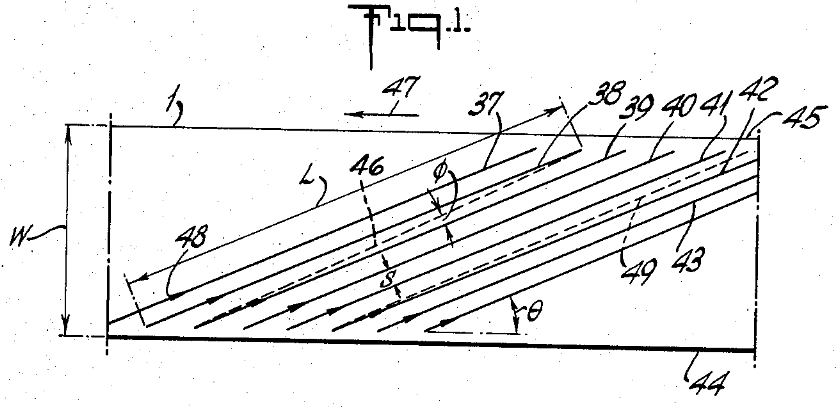
Figures 2, 2A:
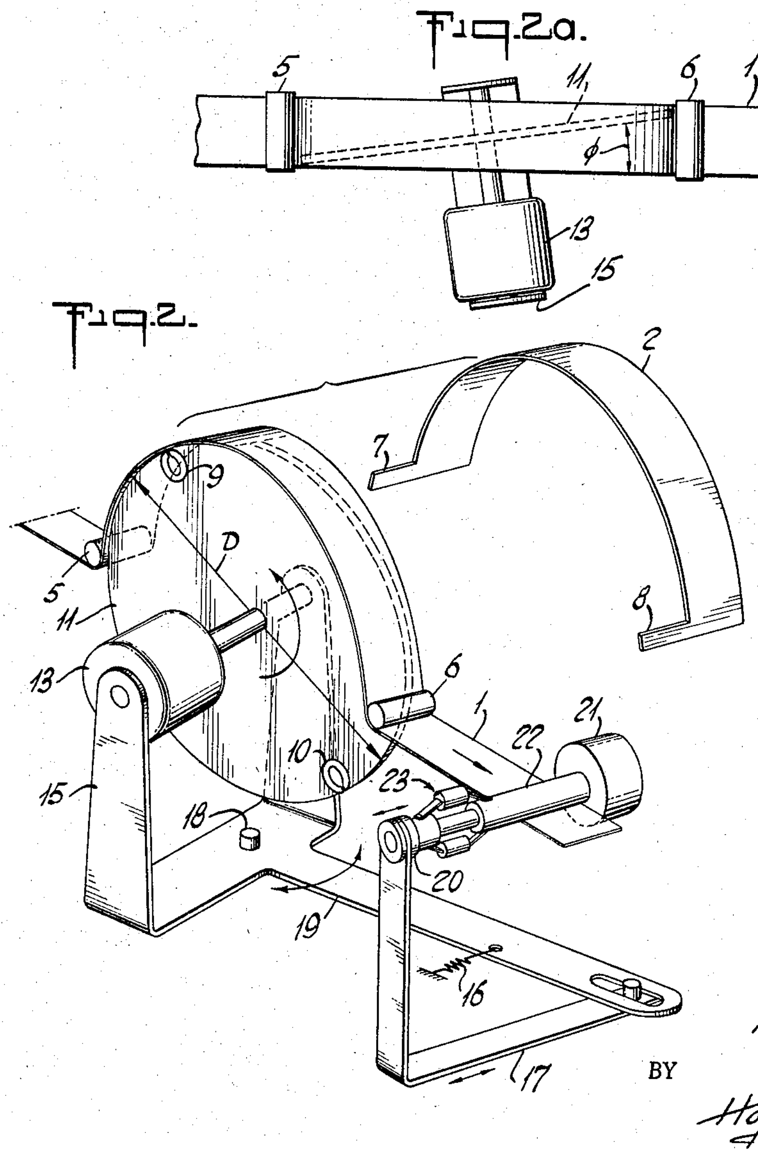

The above mentioned and other features and objects of this invention and the manner of attaining them will become more apparent and the invention itself will best be understood by reference to the following description of embodiments of the invention taken in conjunction with the accompanying drawings wherein:

FIG. 1 shows the recorded pattern produced by a single or two head video tape recorder;

FIGS. 2 and 2*a* illustrate a two head tape recorder/reproducer modified in accordance with the present invention;

FIG. 3 illustrates the complementary head system (a) as applied to the recorded track of FIG. 1; (b) plan view of head positioning; (c) side view of head positioning; and FIG. 4 shows a single head tape recorder/reproducer to which the invention is applicable.

In FIG. 1 may be seen the recorded tracks 37, 38 . . . 43 arranged obliquely, in parallel. This is the conventional arrangement wherein one recorded track corresponds to one field of video signal, and the vertical blanking coincides with the tape edges 44 and 45. In order to obtain such a track disposition, a single or two head video tape recorder may be employed. When reproduction at the original speed is desired, the sensing means moves relative the tape so as to track the recorded signal. This is achieved by the well known tracking control system. In the case of slow or still motion reproduction, however, the reproducing locus is inclined differently (relatively speaking) and is shown by dotted lines 46 (still motion) and 49 (slow motion). It is to be noted thta this is as a result of the tape being stopped in the former case and slowed in the latter.

Figure 3A:
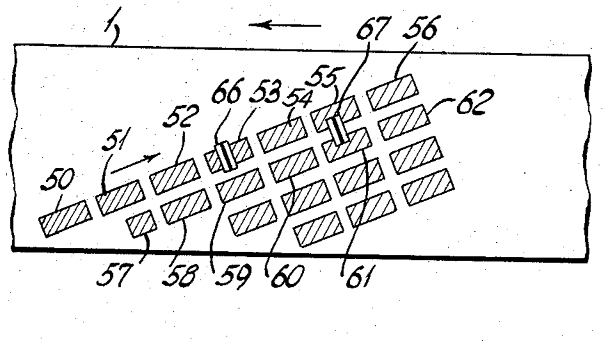
Figure 4:
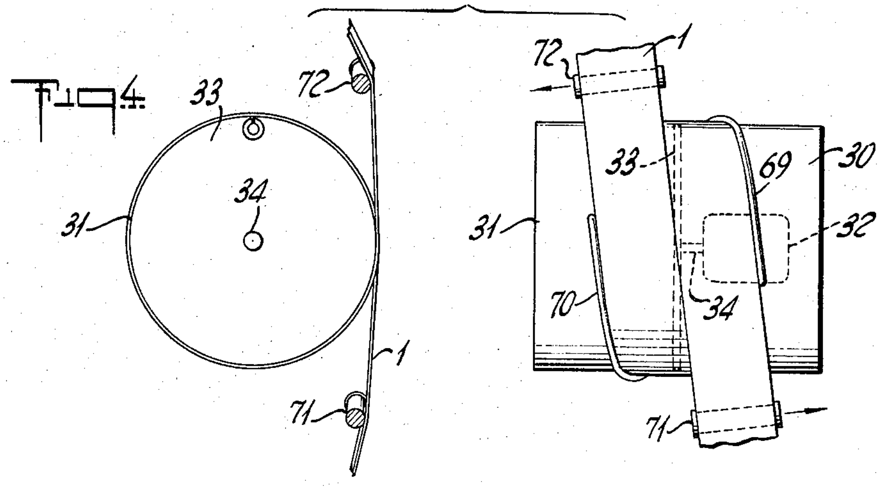

In order to achieve fairly good reproduction in the case of slow or still motion, the arranged tracks must have the pattern shown in FIG. 3*a*; that is, the locus of the horizontal line should be aligned such that each horizontal blanking portion is arranged in line, though the sequential number of the line in a field may differ. Such an arrangement is realized by a proper choice of the track length L, tape width W and the tape translating velocity during recording. However, the correct arrangement as shown in FIG. 3*a* is not easily achieved, as mentioned, because of jitter in the rotation of the head system. Even if it were possible to arrange the tracks correctly, a difficulty still remains due to the cross over zone having an inferior picture quality; i.e. as a head crosses from one track to the other a jump in the sequential line number in a field necessarily occurs. This jump may be 3 to 5 lines for the practical machine. The jump may include skip or overlap depending upon the direction of scanning and the reproducing speed (whether higher or lower than that of recording). In the case of FIG. 3*a*, for example, the sequential number of the horizontal line may skip one line for the slower reproduction and may duplicate one line for faster reproduction. Further, the period in which the head strides over two tracks may suffer from the interference of two signals and from the discontinuity of the image, even with a perfect arrangement, if the motion of the image is very rapid. Also, the period may suffer from noise because of imperfect tracking.

If, however, according to the present invention, the reproducing locus is varied so as to substantially coincide with the locus of recording, at any speed of reproduction the difficulty described above is overcome.

The means for accomplishing this result are schematically shown in FIG. 2. The scanning heads or transducers 9 and 10 are mounted upon a suitable supporting disc 11 which is caused to rotate, by virtue of the motor 13, in the direction of the arrow. The tape 1 meanwhile is translated under the rollers 5 and 6 and over the tape guide 2 (supported at 7 and 8), in the direction of the arrow, by the capstan-motor arrangement 22–21. The plane of the disc is normally inclined (for normal reproduction) at an angle $\phi$ to the direction of tape translation (as shown in FIG. 2*a*).

This may yield a sinusoidal locus strictly speaking and the head contact may become looser at both ends of the track, however, for the actual case such an effect can be neglected since the actual decrement of D is about ⅛ mil, which is negligible. Thus the reproducing locus may be regarded as a straight line.

Translating or translation as used herein is to be broadly interpreted as: motion wherein all parts of the translated body travel at the same speed but not necessarily in the same direction (thus the motion could be arcuate as shown in FIG. 2).

As may be seen in FIG. 2, the disc 11 is pivotally mounted, via the bracket 15, on the pivot 18. The lever arm 19, affixed substantially at a right angle to the lower part of the bracket, controls the inclination of the disc relative the tape translation direction and is biased by the spring 16. With the tape stopped for still motion, the aforementioned arrangement is initially adjusted so that the inclination of the disc coincides with the inclination of the tracks on the tape. Thus perfect "stills" are obtainable.

As the speed of reproduction varies, the inclination of the head axis or disc is caused to vary, dependently, by the governor 23. Thus, for example, when the tape drive capstan 22 is caused to speed up (by control means, not shown, on the motor 21), the centrifugal force on the governor urges the sliding ring 20 toward the tape. This in turn causes the linkage 17 to pivot the lever 19 against the force of spring 16 in a counter clockwise direction.

By properly selecting the dimensions of the apparatus, it is possible to provide a reproducing locus which is substantially parallel to the recorded locus, automatically, for any practical reproduction speed. The following table lists some exemplary dimensions for the embodiment of FIG. 2.

Width of the tape: $W=0.5''$
Diameter of the disc 11: $D=12.6''$
Tape translation velocity: $V=2.5''$ per second during recording
Total length of the track: $L \doteqdot 20''$
Pitch of the tracks: $S \doteqdot 0.00''$
Inclination of the track: $\theta=1.2$ degrees
Inclination of scanning disc during still reproducing $\phi=0.023$ degrees The inclination of the scan axis for slow or quick motion is reversed when the direction of scanning is revered.

It is to be noted that the described embodiment is not the only method for varying the scanning inclination. The tape speed could also be detected by a tachogenerator, for example, and the output of the tachogenerator employed to drive a torque motor connected to twist the disc axis. Suffice it to say several methods are available and FIG. 2 merely portrays the best mode now contemplated. Further, since it is the relative scanning inclination that is important, the tape translation direction may also be altered to vary the relative angle between the scan and tape.

It is to be noted that in slow reproduction the reproducing head may cover two adjacent tracks even though the reproducing locus is parallel to that of recording. If the tracks are arranged as shown in FIG. 3*a*, however, the reproduced picture will still be better than the case without the inclination of the head axis in which discontinuous zone or zones are included.

If the width of the reproducing head is small enough so that it does not cover two tracks, the picture quality will be improved even if the arrangement shown in FIG. 3*a* is not used, except that there will be flickering at times of mistracking.

Figure 3B:
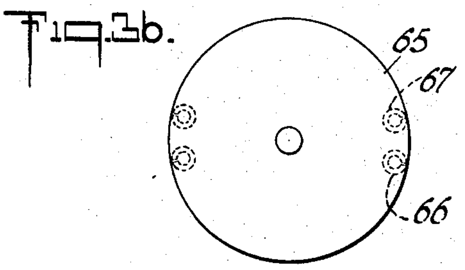
Figure 3C:
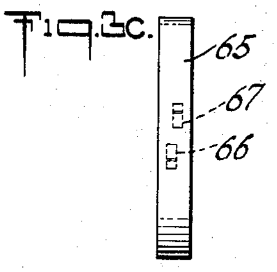

Slow or quick motion of arbitrary speed can also be performed, according to the present invention, with plural reproducing heads arranged "tracking complementarily." These are, e.g., shown in FIG. 3*a* as 66 and 67. The rotating head system is shown in FIG. 3*b* and 3*c* in plan and elevation, respectively. If one head traces the track completely, another head traces the gap between the tracks. Any number of heads may be used. For the case of two complementary heads they may be separated by an odd multiple of half track pitch. In the case of, e.g., slow reproduction, if one head deviates from the track, another head which traces more perfectly is substituted in circuit. In such a manner, good tracking is always possible during the varied speed reproduction. For the tracks shown in FIG. 3*a*, complementary heads may be simultaneously used to yield a summed signal, or they may be switched from one to another within the picture period. If the tracks are not arranged as shown in FIG. 3*a*, the switching of heads may be performed during the vertical blanking period.

FIG. 4 shows schematically the single head video tape recorder in which the tape 1 is translated along a cylindrical guide assembly 30 and 31 while its inner surface is scanned by a rotating head assembly 33, driven by the motor 32. In this case the slight inclination of the axis of the rotating head can not always assure good tracking for variable speed reproduction since a deviation in the attitude of the axis 34 of the motor 32 yields a curved locus on the tape. In this case, however, the tape guides 69 and 70 may be moved, dependent upon the tape speed, to change the relative angle between the tape and scan. Alternatively, if no guide means are used on the cylinder, the guide posts or rollers 71 and 72 may be moved. Further, the diameter or shape of the cylinder may be changed. This small change in diameter may be obtained by the thermal expansion of theguide cylinder 30 and 31 by using a material of large thermal expansion. Of course the rotating head assembly should have a smaller expansion and this can be obtained by utilizing a material of lower thermal expansion coefficient here. However, because the rotating head is self cooled by rotation, its temperature is usually lower than the guide cylinder. The means for modifying the inclination of the locus can be controlled in accordance with the reproducing speed, e.g., by the governor means shown in FIG. 2 or by the tachogenerator torque motor arrangement.

In the automatic control system of the inclination of the track the slight displacement can be detected, e.g., by a strain gauge, a variation in capacitance or inductance, an optical lever, etc. The detected output may then be applied to a torque motor which controls the displacement.

It is to be noted that the type of video tape recorder is not restricted to the above. The invention may be applied to any type which utilizes recorded tracks which can be scanned by a locus of different inclination when the reproducing speed varies. Moreover, it may also be employed to initially record the signal as well as finally reproducing it. Further, the recording medium is not restricted to tape, but may be drum, disc or pulley shaped.

While the foregoing description sets forth the principles of the invention in connection with specific apparatus, it is to be understood that the description is made only by way of example and not as a limitation of the scope of the invention as set forth in the objects thereof and in the accompanying claims:

What is claimed is:

1. In a system for recording and reproducing a periodic signal in which the signal is recorded in substantially parallel tracks on a recording medium, the improvement therein for reproducing said signal at variable speeds comprising: means for translating said recording medium; transducer means; means including said transducer means for scanning said recording medium obliquely to the translation direction thereof; and means responsive to the translation speed of said recording medium for dependently varying the scanning angle of said transducer means relative the translation direction of said recording medium.

2. The system claimed in claim 1, in which said recording medium is in tape form; said means for varying the angle comprising a thermally responsive guide for said tape.

3. The system claimed in claim 2, in which said guide is cylindrical, said tape being helically wound thereon.

4. In a system for recording and reproducing a periodic signal in which the signal is recorded in substantially parallel tracks on a recording medium the improvement therein for reproducing said signal at variable speeds comprising: means for translating said recording medium; transducer means; means including said transducer means for scanning said recording medium obliquely to the translation direction thereof; and means responsive to the traslation speed of said recording medium and coupled to said scanning means for dependently varying the inclination of said scanning means whereby the relative angle between the scanning means and the translation direction of the recording medium is dependent upon the translation speed.

5. The system claimed in claim 4 further comprising means connected to the scanning means for biasing the scanning direction thereof parallel the recorded tracks when the recording medium is at a standstill.

6. The system claimed in claim 4, in which said scanning means comprises a rotating disc, said transducer means being situated at the periphery of said disc.

7. The system claimed in claim 4, in which said scanning means comprises a rotating cylinder, said transducer means comprising a plurality of heads located at the periphery of said cylinder and arranged for complementary tracking.

References Cited

UNITED STATES PATENTS

| | | | |
|---|---|---|---|
| 2,773,120 | 12/1956 | Masterson | 179—100.2 |
| 3,095,473 | 6/1963 | Roizen | 179—100.2 |
| 3,235,670 | 2/1966 | Kihara | 179—100.2 |

BERNARD KONICK, *Primary Examiner.*

J. R. GOUDEAU, *Assistant Examiner.*